United States Patent [19]

Takase et al.

[11] Patent Number: 4,864,198
[45] Date of Patent: Sep. 5, 1989

[54] METHOD OF AND APPARATUS FOR DRIVING THREE-PHASE D.C. BRUSHLESS MOTOR

[75] Inventors: Shigeto Takase, Yokohama; Shigeaki Yamaguchi, Kawasaki; Kentaro Ushioda, Tokyo, all of Japan

[73] Assignee: Nihon Digital Equipment Corporation, Japan

[21] Appl. No.: 149,495

[22] Filed: Jan. 28, 1988

[30] Foreign Application Priority Data

Jan. 30, 1987 [JP] Japan .................................. 62-19956

[51] Int. Cl.$^4$ ............................................ H02K 29/00
[52] U.S. Cl. ...................................... 318/254; 318/138
[58] Field of Search ............... 318/138, 254, 438, 244, 318/439, 696, 715, 720-724

[56] References Cited

U.S. PATENT DOCUMENTS

| 4,309,643 | 1/1982 | Akamatsu | 318/138 |
| 4,382,214 | 5/1983 | Ban et al. | 318/254 |
| 4,392,099 | 7/1983 | Kuniyoshi | 318/797 |
| 4,686,437 | 8/1987 | Langley et al. | 318/254 |
| 4,743,815 | 5/1988 | Gee et al. | 318/254 |

Primary Examiner—William M. Shoop, Jr.
Assistant Examiner—David Martin
Attorney, Agent, or Firm—Finnegan, Henderson, Farabow, Garrett & Dunner

[57] ABSTRACT

A three-phase D.C. brushless motor having a rotor and stator windings of three phases can be driven by alternately switching to the step of causing currents to flow through stator windings of only two phases among the stator windings of three phases or to the step of causing currents to flow through the stator windings of all the three phases each time the rotor rotates 30 degrees in terms of an electrical rotational angle, whereby torque fluctuation can be reduced.

6 Claims, 7 Drawing Sheets

METHOD OF AND APPARATUS FOR DRIVING THREE-PHASE D.C. BRUSHLESS MOTOR

BACKGROUND OF THE INVENTION

1. Field of the Invention

The present invention relates to a method of and apparatus for driving a three-phase D.C. brushless motor.

2. Description of the Prior Art

Figure 7A:
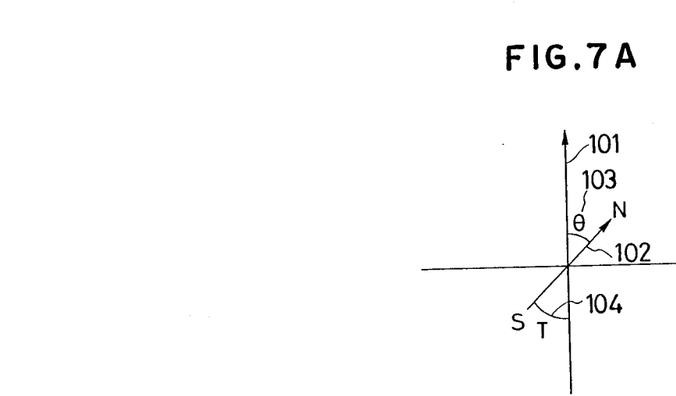
FIG. 7A and 7B are diagrams for explaining the relationship among the magnetic field of a rotor, the vector of a revolving magnetic field and a torque produced in the rotor, in a conventional three-phase D.C. brushless motor.
Figure 7B:
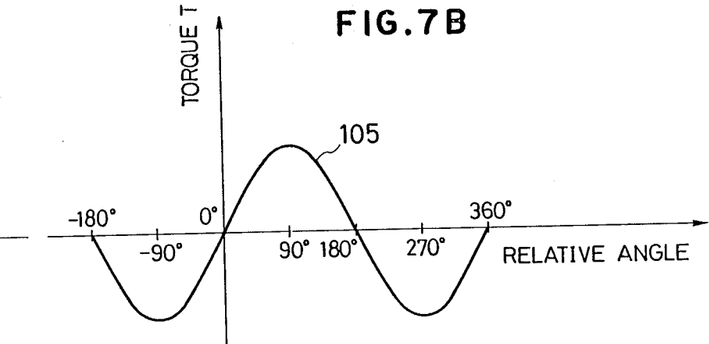

Before describing a prior-art system for driving a three-phase D.C. brushless motor, the relationship among the vector of the magnetic field of a stator, the relative angle $\theta$ of the magnetic field of a rotor and a torque T developing in the rotor will be explained. As shown in a vector diagram of FIG. 7 A of the accompanying drawings, an angle 103 which the vector 102 of a rotor field defines relative to a stator field 101 is denoted by $\theta$, and a torque 104 which a rotor generates counterclockwise on this occasion is denoted by T. Then, the relationship between the relative angle $\theta$ and the torque T ordinarily becomes a waveform whose period is 360 degrees as shown in FIG. 7 B. In addition, it is common that the waveform approximates a sine wave as regards a D.C. brushless motor fabricated so as not to degrade the efficiency thereof. It is also well-known that, in a case where the rotor is multipolar, the relative angle $\theta$ differs from the mechanical rotational angle of the rotor. In the ensuing description, accordingly, angles concerning the rotor shall indicate electrical rotational angles, and cases where mechanical rotational angles are meant will be clearly stated as such.

Figure 8:
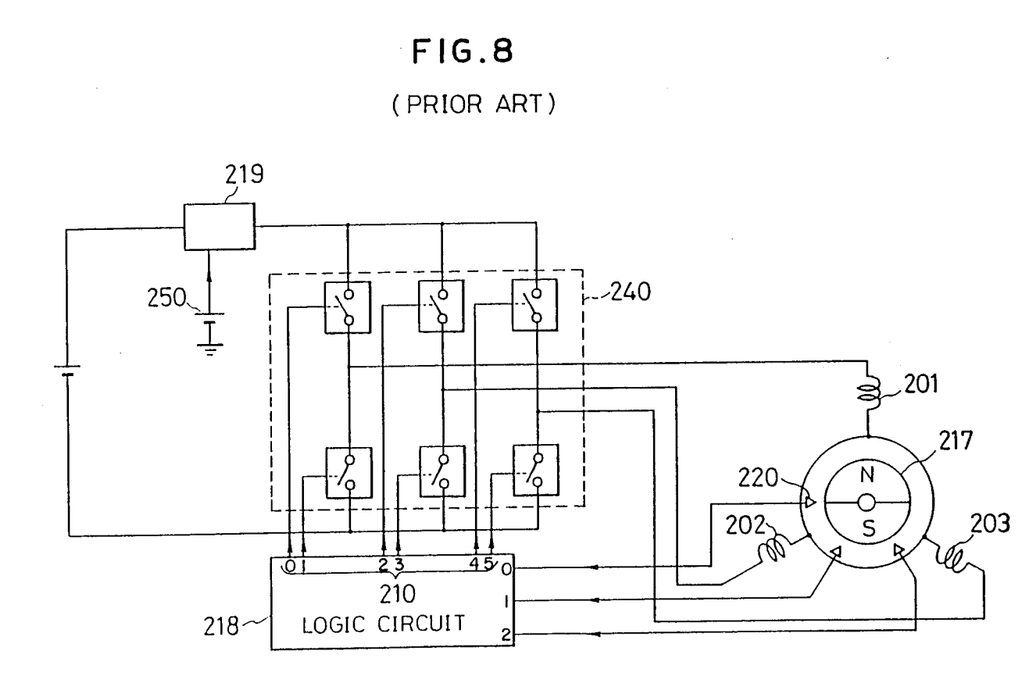
FIG. 8 is a schematic diagram showing an example of a prior-art drive circuit for a three-phase D.C. brushless motor.
Figure 9:
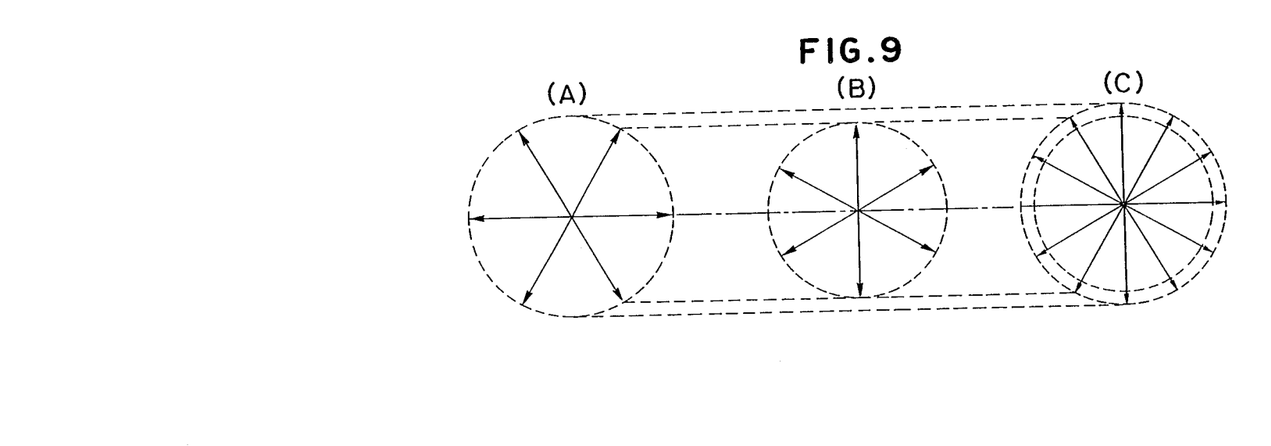
FIG. 9 is a diagram for explaining the vectors of revolving magnetic fields which are generated in a prior-art driving method and the driving method of the present invention.

FIG. 8 schematically shows the connection of a conventional thee-phase D.C. brushless motor and a prior-art bipolar drive circuit which drives the three-phase D.C. brushless motor while controlling current. As illustrated in FIG. 8, this thee-phase D.C. brushless motor includes a rotor 217 and three stator windings 201, 202 and 203 having phase differences of 120 degrees between the respectively adjacent ones. In addition, three magnetic sensors 220 are arranged at intervals of 60 degrees so as to detect the rotational angles of the rotor 217 at steps of 60 degrees. A group of electronic switches 240 are disposed in association with the stator windings 201, 202 and 203 and the magnetic sensors 220. Each of the electronic switches is turned "on" (is closed) when a logic signal applied thereto is "1", and it is turned "off" (is opened) when a logic signal applied thereto is "0". Usually, these electronic switches are constructed of power transistors etc. The prior-art bipolar drive system turns "on" and "off" the electronic switches, thereby to select two of the three stator windings in succession and to cause currents to flow through only the two stator windings. Such ways of causing currents to flow number six in total because there are three combinations of the two stator windings to be selected, the direction of the current being reversible for each of the combinations, and these six ways generate six sorts of magnetic fields defining angles of 60 degrees between the adjacent ones as shown in FIG. 9(A), respectively. Accordingly, a revolving magnetic field at steps of 60 degrees can be formed by turning'- 'on" and "off" the group of electronic switches to change-over the currents of the stator windings in succession. The motor is rotated by forming the revolving magnetic field in accordance with the rotation of the rotor. That is, a logic circuit 218 decides the positions of the rotor at the steps of 60 degrees on the basis of the output signals of the three magnetic sensors 220 and turns "on" and "off" in accordance with the decided positions, whereby the revolving magnetic field is formed at the steps of 60 degrees. This signifies that the currents are caused to flow through the stator windings in successive change-over fashion so as to generate magnetic fields with which the most effective torques are obtained at any angular positions of the rotor. To provide a better understanding of the logical operation of FIG. 8, reference is made to Table 2 which shows a truth table of logic circuit 218. The prior-art drive circuit is furnished with a current control circuit or voltage control circuit 219, which produces a current or voltage proportional to an instructed voltage 250. It is common to employ the current control circuit 219 in a case where the torque is to be controlled irrespective of the rotational frequency of the motor, and to employ the voltage control circuit 219 in a case where the rotational frequency is to be controlled irrespective of the load of the motor.

Figure 10:
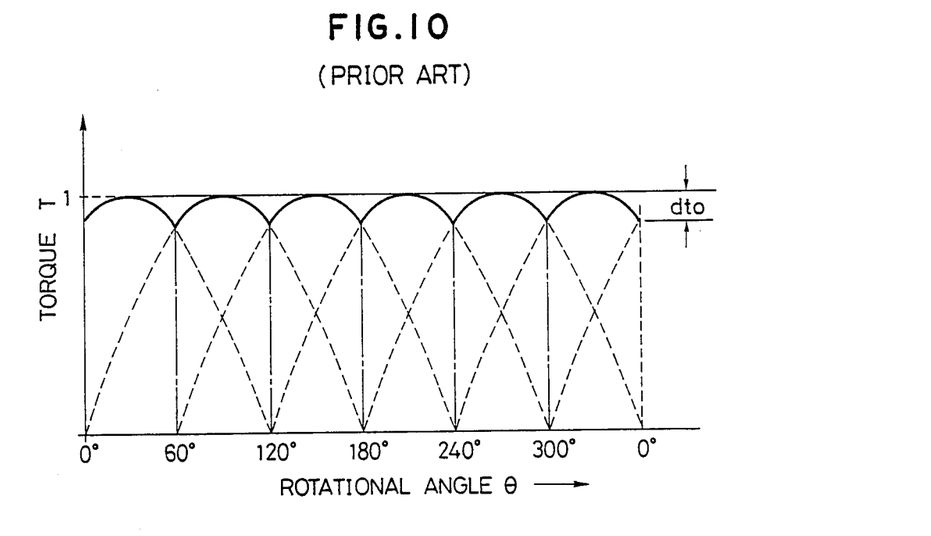
FIG. 10 is a diagram showing the variation of a torque which is produced in a rotor in the prior-art driving method.
Figure 11:
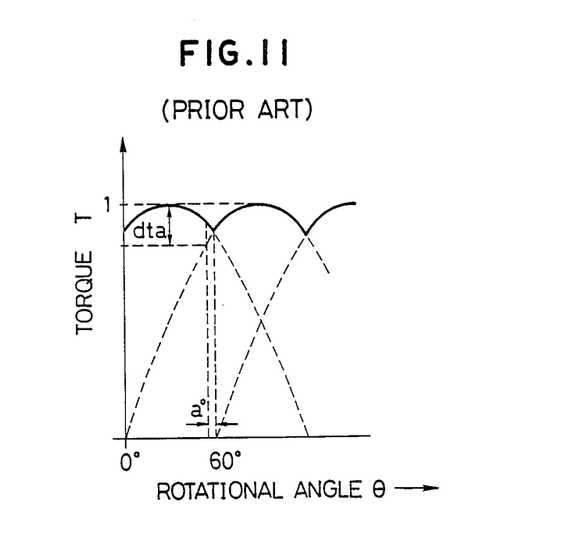
FIG. 11 is a diagram for explaining the fluctuation of a torque which would be caused in the rotor in the prior-art driving method in a case where an error is involved in the mounting position of a magnetic sensor element.

FIG. 10 shows the relationship of the torque T to the rotational angle $\theta$ of the rotor in the case of adopting the prior-art drive method, as stated above. The waveform of the torque T is indicated by a solid line, and the fluctuation width of the torque is indicated by $dT_0$. Assuming that the torque waveform in FIG. 10 is a sine wave, the torque fluctuation width $dT_0$ becomes:

$$dT_0 = 1 - \sin 60° = \text{approximately } 0.134$$

and the torque T drops about 13.4% with respect to the maximum value thereof. Moreover, this corresponds to an assumed case where no error is involved in the detection of the angular positions of the rotor, and in actuality, an angular error a° develops in the detection of the angular positions of the rotor due to, e.g., the mounting errors of the magnetic sensors or the like rotor position detector elements. FIG. 11 illustrates this situation, and a torque fluctuation width $dT_a$ in this case becomes still greater as compared with $dT_0$. That is, assuming that the torque waveform in FIG. 11 is a sine wave, the torque fluctuation width $dT_a$ becomes:

$$dT_a = 1 - \sin(60 - a)°$$

By way of example, at a $=3°$, $dT_a=$approximately, 0.161 and the torque T drops about 16.1% with respect to the maximum value thereof.

The above description has concerned the static torque fluctuations, but when the motor is being rotated, the transient characteristics of the values of the currents flowing through the inductances of the windings also need to be considered. With the prior-art drive system described alone, current I having flowed through the inductance of a certain winding is rendered null, while at the same time current I is suddenly caused to flow through the inductance through which no current has flowed. In actuality, however, the total value of the currents which flow into the motor undergoes a great change on account of, e.g., the generation of a counter electromotive force which is determined by the time constant of the inductance and the rotational frequency of the motor. Due to this change, a great dynamic torque fluctuation arises besides the aforementioned static torque fluctuations at the time of the switching of phases. In this manner, with the foregoing prior-art system for driving the three-phase D.C. brushless motor, the overall torque fluctuation becomes considerably great. Moreover, on account of the great torque fluctuation, considerably loud noise has sometimes occurred during the rotation of the motor.

As expedients for reducing such a torque fluctuation, it has heretofore been proposed to improve the magnetic circuit of a motor and to improve a driving method. Among the prior-art methods proposed, the method improving the magnetic circuit of the motor includes a method which improves the magnetization pattern of a rotor, a method which improves the configuration of stator windings or the configuration of the cores of the stator windings, and so forth. Any of these methods, however, crushes the vicinity of the maximum value of a torque curve to thereby flatten the torque fluctuation. Since the vicinity of the maximum value of the torque curve is originally a part of raising the efficiency of the motor, crushing this part incurs the disadvantage that the efficiency of the motor is lowered.

On the other hand, the prior-art method of reducing the torque fluctuation through the improvement of the driving method includes a method according to which the correction values of torque fluctuation components corresponding to the rotational angles of a rotor are recorded in a read-only memory beforehand, and corrections are made so as to flatten the torque fluctuation by referring to the recorded values, and so forth. Any of these methods, however, premises the joint use thereof with means for detecting the rotational angles at a high resolution and involves the disadvantage of high cost. Moreover, with the methods, in a region where a torque curve falls, current which enters a motor is relatively increased, thereby to lift up a torque. The region where the torque curve falls is originally a part in which the efficiency of the motor is low. Therefore, when the current is increased here, a copper loss increases relatively, to incur the disadvantage that the efficiency of the motor lowers.

An object of the present invention is to provide a method of and apparatus for driving a three-phase D.C. brushless motor which can eliminate the problems of the prior art as stated above.

Another object of the present invention is to provide a three-phase D.C. brushless motor which can eliminate the problems of the prior art as stated above.

SUMMARY OF THE INVENTION

According to an aspect of the present invention, there is provided a method of driving a three-phase D.C. brushless motor having rotor and stator windings of three-phases, the method including the steps of: (a) causing currents to flow through stator windings of only two phases among the stator windings of three phases; (b) causing currents to flow through the stator windings of all the three phases; and (c) alternately switching to the above step (a) or to the above step (b) each time the rotor rotates 30 degrees in terms of an electrical rotational angle, whereby torque fluctuation can be reduced.

According to another aspect of the present invention, there is provided an apparatus for driving a three-phase D.C. brushless motor having a rotor and stator windings of three phases, the apparatus comprising detection means for detecting an electrical angle of the rotor every 30 degrees, and control means for alternately switching to the step of causing currents to flow through stator windings of only two phases among the stator windings of three phases or to the step of causing currents to flow through the stator windings of all the three phases in response to the detection by the detection means, whereby torque fluctuation can be reduced.

For a motor having only one set of star-connected stator windings with three terminals, according to a feature of the present invention, at a step of driving the motor, one of the three terminals is subjected to a positive potential, another of the three terminals is subjected to a negative potential, and the remaining one of the three terminals is open. In this step, an electric current flows in series through the stator winding connected between the positive terminal and the neutral point and the stator winding connected between the neutral point and the negative terminal, while no electric current flows through the stator winding connected between the neutral point and the open terminal. Therefore, in such step, an electric current flows through only two stator windings. At another step of driving the motor, the terminal that was open at the previous step is subjected to a positive or negative potential. This results in two of the three terminals being subjected to the same potential. Therefore, substantially the same electric currents flow in parallel through the two stator windings connected between the neutral point and the two same potential terminals, and an electric current equal to the sum of electric currents flowing through the two stator windings flows through the remaining stator winding. Namely, in this step, electric currents flow through all the three stator windings. A stator magnetic field, as produced when electric current flows through only two stator windings, and a stator magnetic field, as produced when electric current flows through all three stator windings, are out of phase by an electrical rotational angle of 30 degrees.

For a motor having only one set of delta-connected stator windings with three terminals, according to a feature of the present invention, at a step of driving the motor, one of the three terminals is subjected to a positive potential, another of the three terminals is subjected to a negative potential, and the remaining one of the three terminals is open. In this step, an electric current flows through the stator winding connected directly between the positive and negative stator windings, and an electric current equal to substantially one half of the above-mentioned electric current flows through the remaining two stator windings connected between the positive and negative terminals through the open terminal. Therefore, in such step, electric currents flow through all three stator windings. At another step of driving the motor, the terminal that was open at the previous step is subjected to a positive or negative potential. This results in two of the three terminals being subjected to the same potential. While no electric current flows through the stator winding connected between the same potential terminals, substantially the same electric current flows in parallel through the remaining two stator windings. Namely, in this step, electric current flows through only two stator windings. The stator magnetic field, as produced when electric current flows through all three stator windings, is out of phase by an electrical rotational angle of 30 degrees.

As seen from the above, according to the present invention, a revolving magnetic field which rotates 30 degrees step by step can be produced for both a motor having star-connected stator windings and a motor having delta-connected stator windings, by alternately switching from the step in which electric currents flow through only two stator windings to the step in which electric currents flow through all three stator windings.

Although the present invention can be applied to both a motor having star-connected stator windings and a motor having delta-connected stator windings as mentioned above only an embodiment of the present invention applied to a motor having star-connected stator windings will be described.

The control means may include a current control circuit which can change values of the currents to flow through the stator windings, in response to the switching, or a voltage control circuit which can change values of voltages to be applied across terminals of the stator windings, in response to the switching, or a regulated voltage circuit which continually applies a constant voltage across terminals of the stator windings, in spite of the switching.

According to still another aspect of the present invention, there is provided a three-phase D.C. brushless motor having rotor and stator windings of three phases, the motor containing detection means for detecting an electrical angle of the rotor every 30 degrees so that the motor can be driven by alternately switching to the step of causing currents to flow through stator windings of only two phases among the stator windings of three phases or to the step of causing currents to flow through the stator windings of all the three phases each time the rotor rotates 30 degrees in terms of an electrical rotational angle.

The present invention will now be described in further detail with regard to preferred embodiments as illustrated in the accompanying drawings.

DESCRIPTION OF THE PREFERRED EMBODIMENTS

Before describing the preferred embodiments of the present invention, the principle of the driving system of the present invention, will be first elucidated in comparison with the prior-art driving system described above.

According to the principle of the present invention, even the prior-art drive circuit in FIG. 8 can cause currents to flow through all the stator windings by the use of the group of electronic switches 240 if it is improved. More specifically, one of the terminals of the three stator windings is connected to a power source side, another terminal is connected to a ground side, and the remaining terminal is connected to the power source side or the ground side, whereby the currents can be caused to flow through all the three stator windings. On this occasion, two of the three stator windings form parallel branches. Assuming that the resistance values of the respective stator windings be substantially equal, a current equal to a half of a current to flow through the remaining stator winding flows through each of the two parallel branches. The ways of causing the currents to flow number six, and form six vectorial magnetic fields whose magnitudes are equal and whose directions differ 60 degrees between the adjacent ones. The group of six vectorial magnetic fields are shown in FIG. 9(B). As illustrated in FIG. 9(B), this group of vectors shifts 30 degrees in direction with respect to the group of vectors (refer to FIG. 9(A)) formed in the case of causing the currents to flow through only two of the stator windings as stated in the description of the prior art. When the two groups of vectors are superposed after the magnitudes of the vectors thereof are substantially equalized by adjusting current values in the case of causing the currents to flow through all the three stator windings, twelve vectors whose magnitudes are equal and whose directions differ 30 degrees between the adjacent ones are formed as illustrated in FIG. 9(C). This indicates that the group of switches 240 are successively changed-over to select the two groups of vectors with the phase shifts of 30 degrees therebetween alternately and in order, whereby a revolving magnetic field of steps of 30 degrees is established. That is, the group of switches 240 are successively changed-over at intervals of 30 degrees in accordance with the rotational positions of the rotor, and the rotor establishes the revolving magnetic field with which the most effective and uniform torques are always obtained, whereupon the motor can be rotated.

Figure 2:
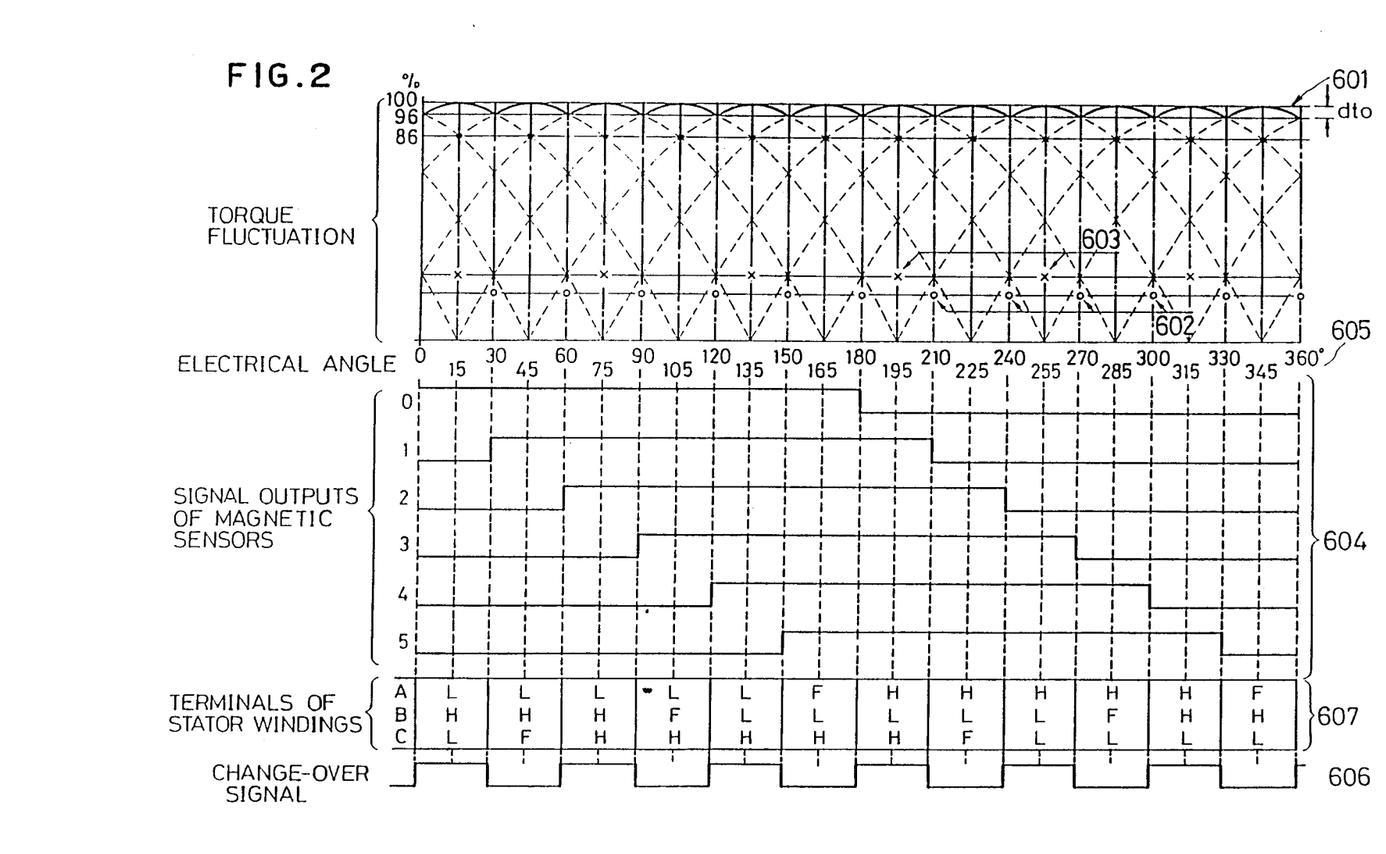
FIG. 2 is a diagram showing timings indicative of the relationships between the torque fluctuation and control signals of the motor in the driving apparatus of FIG. 1.

A torque fluctuation on that occasion becomes as indicated by a curve 601 of solid line in FIG. 2. Besides, a torque fluctuation width in that case is indicated by $dt_0$, which is seen to be considerably less than the torque fluctuation width $dT_0$ in the prior-art driving system.

More specifically, assuming that the torque curve 601 in FIG. 2 is a sine wave, $$dt_0 = 1 - \sin 75° = 0.034$$

which is sharply improved as compared with the torque fluctuation $dT_0 = 0.134$ in the prior-art system.

Figure 3:
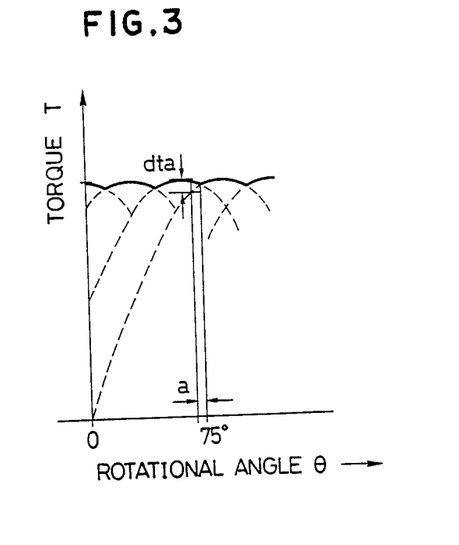
FIG. 3 is a diagram for explaining a torque fluctuation which would be caused in the driving system of the present invention in a case where an error is involved in the mounting position of a magnetic sensor element.

Next, the influence on the torque fluctuation will be described as to a case where an angular error a exists in the detection of the angular position of the rotor. As illustrated in FIG. 3, assuming the torque waveform to be a sine wave, a torque fluctuation width is:

$$dt_a = 1 - \sin(75-a)°$$

By comparing this fluctuation width with the fluctuation width $dT_a$ in FIG. 11, it is understood that the influence of the error of the angular position detection of the rotor is also relieved. For example, at a=3, $$dt_a = 1 - \sin(72°) = 0.049$$

which is sharply reduced in comparison with the torque fluctuation $dT_1 = 0.161$ for the same detection angle error in the prior-art system.

It is the basic principle of the present invention that, in this manner, the step of causing currents to flow through only two of the stator windings of three phases and the step of causing currents to flow through all the three stator windings are alternately switched each time the rotor rotates 30 degrees, whereby the torque fluctuation is decreased.

In FIG. 2, positions of marks o indicated by reference numeral 602 are the angular positions of the rotor at which the winding currents are to be switched in the driving system of the present invention, whereas positions of marks x indicated by reference numeral 603 are the angular positions of the rotor at which the winding currents are to be switched in the prior-art driving system. As understood from the illustration, in the prior-art driving system, the angular position of the rotor to change-over the windings appears each time the rotor rotates 60 degrees, whereas in the present invention, the angular position to change-over the windings appears each time the rotor rotates 30 degrees, and it shifts 15 degrees relative to the case of the prior-art driving system. In order to perform the driving system of the present invention, accordingly, means capable of directly detecting or estimating such angular positions of the rotor needs to be comprised.

Now, the means for detecting the angular postions of the rotor will be described. In FIG. 2, reference numeral 604 indicates signal outputs from individual magnetic sensor elements in the case where the six magnetic sensors each of which generates a binary signal in accordance with the polarity of the magnetic field of the rotor are arranged at intervals of 30 degrees. Owing to these signals, it is possible to detect the twelve possible angular positions of the rotor indicated by reference numeral 602 in FIG. 2, at 0 degrees, 30 degrees, 60 degrees, 90 degrees, 120 degrees, 150 degrees, 180 degrees, 210 degrees, 240 degrees, 270 degrees, 300 degrees and 330 degrees. In the prior-art driving system, the angular position of the rotor may be detected every 60 degrees, and hence, the three magnetic sensors at the intervals of 60 degrees suffice. On the other hand, in the present invention, as understood from FIG. 2, the magnetic sensors are arranged at the positions shifting 15 degrees on both the right and left sides of the positions in the prior-art driving system and therefore six magnetic sensors are required. As these magnetic sensors, any of Hall elements, magneto resistance elements, etc. can be used. As the means for detecting the angular position of the rotor every 30 degrees in this manner, there are also a method employing elements other than the magnetic sensors, a method jointly using different detection means, a method estimating the positions in relation to time, etc., which will be explained later.

Next, there will be described methods by which, in the driving system of the present invention, in alternately changing-over the case of causing currents to flow through only two of the three stator windings and the case of causing currents to flow through all the three stator windings, the magnitudes of the vectors of the vector groups developed in the respective cases are substantially equalized.

Considered as the first method is an expedient in which the values of the currents to flow through the stator windings are switched by a single current control circuit. As stated before, in order to equalize the magnitudes of the vectors on the respective occasions of the group of stator magnetic-field vectors (refer to FIG. 9(A)) formed in the case of causing currents to flow through only two of the three stator windings and the group of stator magnetic-field vectors (refer to FIG. 9(B)) formed in tee case of causing currents to flow through all the three stator windings, the values of the currents to flow through the stator windings need to be changed in accordance with the respective cases. The extent of a ratio at which the currents may be changed, will be elucidated.

As to the case of causing currents to flow through only two of the three stator windings, the current value is denoted by $I_{tw}$, and the magnitude of the magnetic field vector generated is denoted by $H_{tw}$. Since these two quantities are proportional, the following holds with a proportion constant denoted by $K_{tw}$:

$$H_{tw} = K_{tw} \times I_{tw}$$

On the other hand, as to the case of causing currents to flow through all the three windings, the current value is denoted by $I_{th}$, and the magnitude of the magnetic field vector generated is denoted by $H_{th}$. Since these two quantities are proportional, the following holds with a proportion constant denoted by $K_{th}$:

$$H_{th} = K_{th} \times I_{th}$$

In order to establish uniform revolving magnetic fields, the current value $I_{tw}$ and $I_{th}$ need to be selected so as to hold:

$$H_{tw} = H_{th}$$

and they need to be switched for the respective cases.

Figure 1:
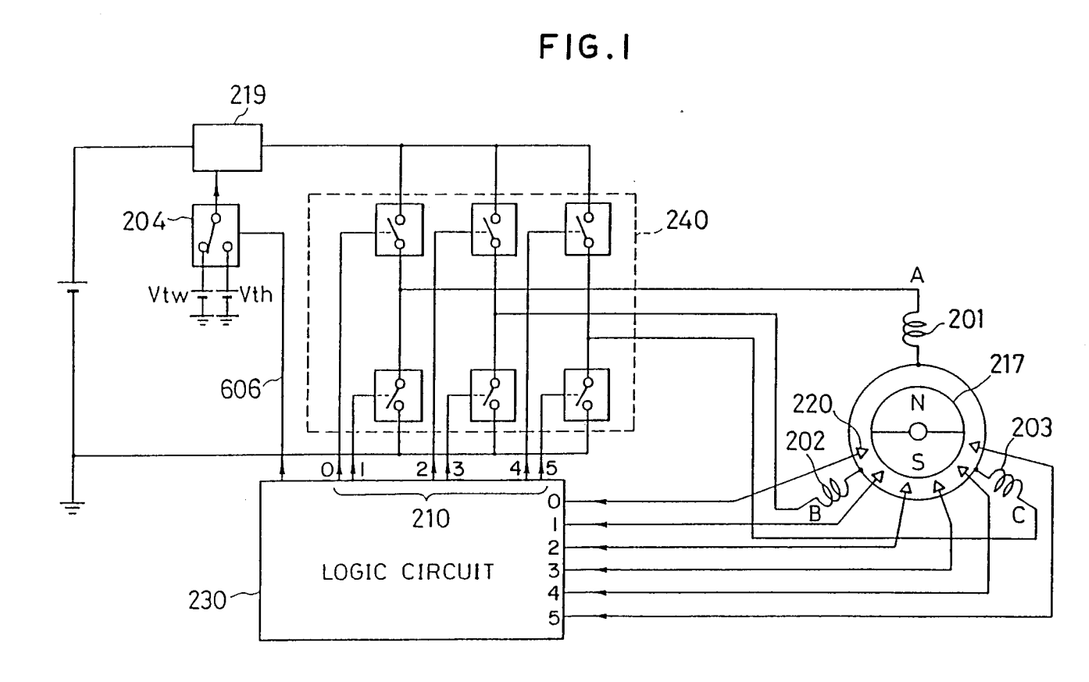
FIG. 1 is a diagram schematically showing the construction of an apparatus for driving a three-phase D.C. brushless motor as an embodiment of the present invention.

Next, there will be described a driving apparatus as the preferred embodiment of the present invention for driving the three-phase D.C. brushless motor on the basis of such a principle of the present invention. FIG. 1 schematically shows the circuit connection of the driving apparatus. As illustrated in FIG. 1, in this driving apparatus, magnetic sensors 220 are arranged in a number of six, and the output signals thereof are input to a logic circuit 230. The signals indicated by reference numeral 604 in FIG. 2 are the output signals from the respective magnetic sensors.

In accordance with the angular positions of the rotor detected from these signals, the logic circuit 230 generates signals 210 for turning "on" and "off" a group of electronic switches 240 so as to establish the revolving magnetic field as steps of 30 degrees as explained before and simultaneously generates a signal (indicated by reference numeral 606 in FIG. 2 and FIG. 1) instructive of either the case of causing currents to flow through all the stator windings or the case of causing currents to flow through only two of the stator windings. Owing to this signal, an electronic switch 204 changes-over instructive voltages $V_{tw}$ and $V_{th}$ for a current control circuit 219. Table 1 is a truth table of logic circuit 230. In FIG. 2, a section indicated by reference numeral 607 expresses the ways of causing currents to flow through the stator windings. Regarding the terminals A, B and C of the stator windings, letter H denotes the connection of the terminal to a power source side, letter L denotes the connection thereof to a ground side, and letter F denotes the floating or disconnection thereof. The current control circuit 219 is the same as in FIG. 8, and produces a current proportional to the instructive voltage. Therefore, if the voltages $V_{tw}$ and $V_{th}$ are set so as to produce the current values $I_{tw}$ and $I_{th}$ adapted to hold $H_{tw} = H_{th}$ as stated before, the revolving magnetic field of uniform magnitude can be formed.

Then, setting such current values $I_{tw}$ and $I_{th}$ will be described. It is assumed that all the stator windings have equal D.C resistances R. It is also assumed that current I flowing through each stator winding and the magnitude of a magnetic field generated be proportional, and that the magnetic fields be vectorially combinable. That is, $$H = K \times I$$

where K denotes a proportion constant, which is assumed to have the same value for all the windings.

Figure 4A:
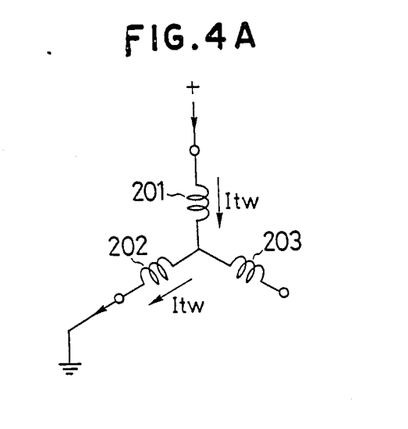
FIG. 4A, 4B, 5A and 5B are diagrams for explaining the vectors of revolving magnetic fields which are generated by the driving system of the present invention in FIG. 1.
Figure 4B:
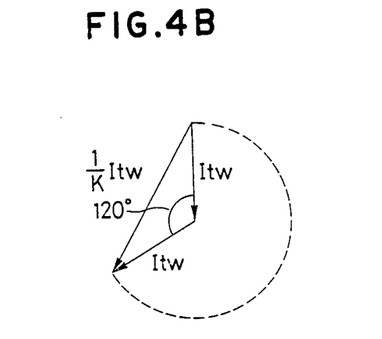

FIG. 4 A illustrates a case where, by turning "on" and "off" the group of electronic switches, the terminal of one of the Y-connected windings is connected to the power source side, the terminal of another is connected to the ground side, and the terminal of the remaining one is floated, thereby causing currents to flow through two of the three windings. Letting $I_{tw}$ denote the value of a power source current on this occasion, equal currents of $I_{tw}$ flow through the stator winding 201 and the stator winding 202, respectively. Therefore, the magnitude $H_{tw}$ of the combined magnetic field in this case becomes:

$$H_{tw} = \sqrt{3} \times K \times I_{tw} \tag{1}$$

as shown in FIG. 4 B. In addition, since the combined resistance of the stator windings in this case is 2R, the copper loss of the motor becomes:

$$P_{tw} = (I_{tw})^2 \times 2R \tag{2}$$

Figure 5A:
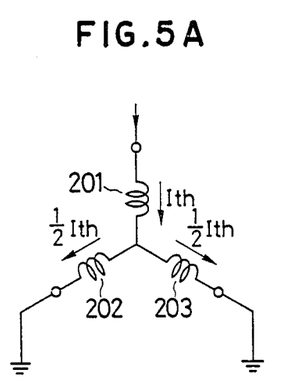
Figure 5B:
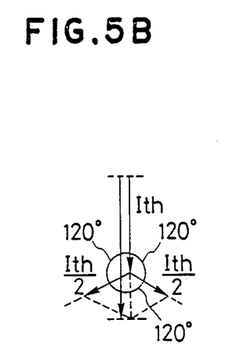

FIG. 5 A illustrates a case where, by turning "on" and "off" the group of electronic switches, the terminal of one of the Y-connected windings is connected to the power source side, and the terminals of the remaining two windings are grounded, thereby causing currents to flow through all the three windings. Assuming that all the resistances of the stator windings be equal, and letting $I_{th}$ denote the value of a power source current, a current of $I_{th}$ flows through the stator winding 201, and currents each being of $I_{th}/2$ flow through the stator windings 202 and 203, respectively. Therefore, the magnitude $H_{th}$ of the combined magnetic field in this case becomes:

$$H_{th} = 3/2 \times K \times I_{th} \tag{3}$$

as shown in FIG. 5 B. In addition, since the combined resistance of the stator windings in this case is (3/2)R, the copper loss becomes:

$$P_{th} = (I_{th})^2 \times (3/2)R$$

For the purpose of establishing $H_{tw} = H_{th}$, accordingly, it is understood from Eq. (1) and Eq. (3) that $I_{tw}$ and $I_{th}$ may be set so as to hold the following relation:

$$I_{th} = (2/\sqrt{3}) \times I_{tw} \tag{5}$$

Besides, in the case where $I_{tw}$ and $I_{th}$ are set in this manner, the copper loss becomes as follows in view of Eqs. (4) and (5):

$$\begin{aligned} P_{th} &= (2/\sqrt{3})^2 \times (I_{tw})^2 \times 3/2 \times R \\ &= (I_{tw})^2 \times 2R \end{aligned} \tag{6}$$

In view of this equation and Eq. (2), the following is held:

$$P_{th} = P_{tw} \tag{7}$$

This signifies that the copper losses become equal in both the step of causing the currents to flow through all the three windings and the step of causing the currents to flow through only the two windings. Thus, it is understood that, according to the driving system of the present invention, the efficiency is equal to the efficiency in the prior-art driving method, so the torque fluctuation can be reduced without sacrificing the efficiency.

Next, there will be elucidated dynamic torque fluctuations in the case of considering the transient characteristics of the values of currents flowing through the inductances of the windings. With note taken of one stator winding, in the prior-art driving system, the current value changes between 0 and $I_{tw}$. In contrast, in the driving system of the present invention, the current value changes in the sequence of 0, $(1/\sqrt{3}) I_{tw}$, $I_{tw}$, $(2/\sqrt{3}) I_{tw}$, $I_{tw}$, $(1/\sqrt{3}) I_{tw}$, and 0, so that the transient fluctuation of the current value is less than in the prior-art driving system. That is, in the prior-art driving system, the current value changes from 0% to 100%, whereas in the driving system of the present invention, the current value changes in the sequence of 0%, 58%, 100%, 115%, 100%, 58% and 0%, and hence, the change width of the current value is 58% at the maximum. Accordingly, the dynamic torque fluctuations which arise due to the transient fluctuations of the current values become less than in the prior-art driving system.

Figure 6:
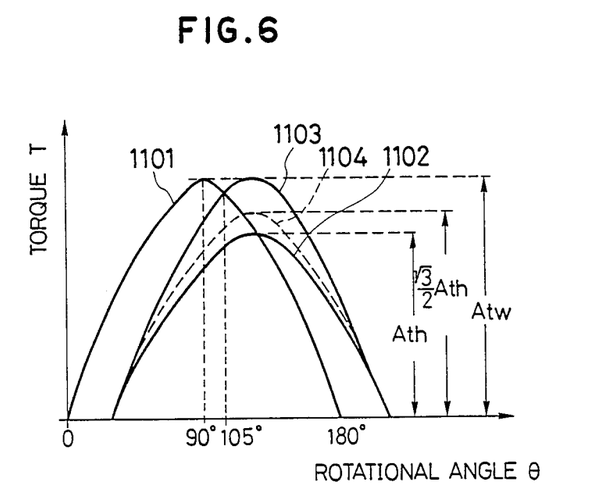
FIG. 6 is a diagram for explaining a case where a torque curve is distorted.

Under such a simplified assumption, the ration of $I_{th}$ to $I_{tw}$ may be set at $2/\sqrt{3}$ times. In actuality, however, this value is not always valid on account of the distortion of the torque, non-uniformities in the windings and the magnetic circuits, and so on. Accordingly, the ratio may be properly set so as to minimize the torque fluctuations, depending upon the characteristics of the motor. FIG. 6 shows an example in the case where the torque curve is distorted. A curve 1101 indicates the torque per current in the case of causing currents to flow through only the two stator windings, and $A_{tw}$ denotes the maximum value thereof. A curve 1104 in a dotted line is a curve which indicates the torque per current in the case of causing currents to flow through all the three stator windings, under the supposition that the torque curve is a distortion less sine wave as described on the occasion of the simplified assumption before. A curve 1102 is a curve which indicates the torque per current in the case of causing currents to flow through all the three stator windings and which is so distorted that the peak of the sine wave is crushed, and $A_{th}$ denotes the maximum value thereof. When $I_{th}$ and $I_{tw}$ are set so as to hold the following even in such a case:

$$I_{th} = (A_{tw}/A_{th}) \times I_{tw} \tag{8}$$

the torque curve 1102 is corrected as shown by a curve 1103, and the torque fluctuation can be rendered uniform.

It is possible even with a voltage control circuit to generate $I_{tw}$ and $I_{th}$ which establish $H_{tw} = H_{th}$. Therefore, this measure will now be described. For the brevity of the description, consider a drive circuit in which the foregoing current control circuit 219 in FIG. 1 is substituted by the voltage control circuit. That is, in the drive circuit of FIG. 1, the voltage control circuit 219 is assumed to generate voltages proportional to instructive voltages.

The counter electromotive forces and the combined resistances of the windings are different in the case where currents are flowing through all the stator windings and in the case where currents are flowing through only two of the windings. Therefore, $I_{tw}$ and $I_{th}$ adapted to establish $H_{tw} = H_{th}$ can be caused to flow in such a way that the values of the voltages between the terminals of the windings are switched according to the individual cases. Accordingly, the instructive voltages $V_{tw}$ and $V_{th}$ for the voltage control circuit 219 are set so as to generate $I_{tw}$ and $I_{th}$ for establishing $H_{tw} = H_{th}$, and they are switched by the signal 606, whereby a uniform revolving magnetic field can be formed. More specifically, it is assumed as in the preceding description that the D.C. resistances R of the individual stator windings be all equal and that the currents I flowing through the respective stator windings and the magnitudes of the magnetic fields H generated be proportional and be vectorially combinable. The torque and the counter electromotive force which develop at a certain rotational frequency, are in proportion. Therefore, letting $V_r$ denote the counter electromotive force which develops when currents are caused to flow through only the two stator windings, the counter electromotive force which develops when currents are caused to flow through the three stator windings becomes $(\sqrt{3}/2) V_r$. In addition, when the currents are caused to flow through only the two stator windings, the combined resistance of the windings is 2R, and when the currents are caused to flow through the three stator windings, the combined resistance is (3/2) R. Therefore, the following equations hold:

$$V_{tw} = 2R \times I_{tw} + V_r \tag{9}$$

$$V_{th} = (3/2)R \times I_{th} + (\sqrt{3}/2)V_r \tag{10}$$

Here, when $I_{tw}$ and $I_{th}$ are set as in Eq. (5) in order to make the torque fluctuation uniform, the following holds:

$$\begin{aligned} V_{th} &= \sqrt{3}\, I_{tw} \times R + (\sqrt{3}/2)V_r \\ &= (\sqrt{3}/2) \times (2R \times I_{tw} + V_r) \end{aligned} \tag{11}$$

From this equation and Eq. (9), $$V_{th} = (\sqrt{3}/2) \times V_{tw} \tag{12}$$

holds. Accordingly, when the voltage $V_{tw}$ is applied across the terminals of the two stator windings in the case of causing the currents to flow through only the two of the three stator windings each having the resistance R, the voltage $V_{th}$ given by Eq. (12) is applied in the case of causing the currents to flow through all the three stator windings, whereby the torque fluctuation can be made uniform.

Next, in the present invention, an effect is attained even when, without disposing the means for switching the terminal voltages of the windings as stated above, an identical voltage is applied across the terminals of the windings in both the case of causing currents to flow through all the stator windings and the case of causing currents to flow through only two of them. Therefore, this measure will be described. When the identical voltage is applied across the terminals of the windings in both the case of causing the currents to flow through all the stator windings and the case of causing the currents to flow through only the two stator windings, the values of the currents to flow through the windings become different because the counter electromotive forces and the combined resistances of the windings are unequal in these two cases. That is, under the condition under which the fixed voltage is applied, a greater current flows when the counter electromotive force or the combined resistance is smaller, and a smaller current flows when it is greater. In general, a case of greater counter electromotive force is a case where the torque developed per stator winding current is greater and where the combined inductance of the windings is greater, so that the combined resistance is also greater. The converse holds true of a case of smaller counter electromotive force. Accordingly, the smaller current flows in the case where the developed torque per stator winding current is greater, and the greater current flows in the case where the developed torque per stator winding current is smaller. As a result, the torques in the two cases are about to become uniform. With some torque characteristics of motors, even when the motor is continually driven by the fixed voltage in this manner, the torque fluctuation can be considerably reduced as compared with that in the prior-art method.

This point will be explained in more detail by the use of exemplary numerical values. In the case where the torque curve is distorted as shown in FIG. 6, $A_{tw}/A_{th} = 1.33$ is assumed by way of example. It is known that the torque and the counter electromotive force which develop are in proportional relationship. Therefore, when the counter electromotive force which develops in the case of causing currents to flow through the two stator windings is $V_r$ at a certain rotational frequency, the counter electromotive force which develops at this rotational frequency when currents are caused to flow through all three stator windings is considered to become $(1/1.33) V_r = 0.75 V_r$. The combined resistances of the stator windings in the respective cases are 2R and (3/2) R=1.5 R. Therefore, when the value of the voltages to be applied across the terminals is put as follows:

$$V_{tw}=V_{th}=V \tag{13}$$

an equality for the voltage in the case of causing the currents to flow through only the two stator windings becomes:

$$V=2R\times I_{tw}+V_r \tag{14}$$

An equality for the voltage in the case of causing the currents to flow through all the three stator windings becomes:

$$V=1.5\ R\times I_{th}+0.75\ V_r \tag{15}$$

Assuming that the counter electromotive force $V_r$ on this occasion the ⅛ of the applied voltage V, this is written as:

$$V_r=0.125\ V \tag{16}$$

When this equation is substituted into Eq. (14) and Eq. (15), the following holds:

$$V=2R\times I_{tw}+0.125\ V \tag{17}$$

$$V=1.5\ R\times I_{th}+0.094\ V \tag{18}$$

From Eqs. (17) and (18), $$I_{th}=1.38\ I_{tw} \tag{19}$$

holds. That is, in the step of causing the currents to flow through all the three stator windings, the current which is 1.38 times greater than in the step of causing the currents to flow through only the two stator windings flows. Accordingly, the maximum value $A_{th}'$ of the torque on this occasion becomes:

$$\begin{aligned}A_{th}' &= (1/1.3)\times 1.38 \times A_{tw}\\ &= 1.06\ A_{tw} \approx A_{tw}\end{aligned} \tag{20}$$

and the torque is rendered substantially uniform. In this manner, depending upon the torque curve or the working rotational frequency of the motor, the torque fluctuation can be sometimes reduced even when the motor is continually driven by the fixed voltage without switching the values of the voltages or currents of the windings.

As described above, in order to perform the driving system of the present invention, the means for detecting or estimating the angular positions of the rotor at the intervals of 30 degrees is required. Especially in case of accelerating or decelerating the motor in a short time or using the motor in a stationary or nearly stationary state with a balanced load, it is sometimes difficult to estimate the angular positions of the rotor. It is therefore convenient to prepare a three-phase D.C. brushless motor which has self-contained means capable of continually detecting the angular positions of the rotor thereof at intervals of 30 degrees.

The angular positions of the rotor to change-over the revolving magnetic fields in the present invention are positions which shift 15 degrees in the clockwise direction and the counterclockwise direction, respectively, with respect to the angular positions of the rotor to change-over the revolving magnetic fields in the prior-art driving system. Therefore, the mounting positions of the rotor angular-position detection means such as magnetic sensors or photosensors become positions which shift 15 degrees in the clockwise direction and the counterclockwise direction, respectively, with respect to the mounting positions of the rotor angular-position detection means in the prior-art driving system, and twelve places in total need to be detected In case of the rotor angular-position detection means adapted to deliver a binary signal corresponding to the polarity of the magnet of the rotor, such as the magnetic sensor, or an optical element which detects an optical signal on the rotor changing the reflection factor or transmission factor of light in correspondence with the polarity of the rotor, the detection of the twelve places necessitates the use of six detection means. Alternatively, since the twelve rotor angular positions can be expressed by 4 bits, they can be detected by detection means numbering four in a case where the signals of the 4 bits are recorded on the rotor. Such detection means is usually called an "absolute encoder."

When not only the rotor angular-position detection means is contained in the motor itself in this manner, but also part of the drive circuit in FIG. 1 is contained therein, electronic circuitry can be efficiently installed, and the number of connection leads between the motor and an electronic circuit outside it can be reduced. By way of example, it is considered to build the logic circuit 230 in the motor and to further build the group of electronic switches 240 therein.

Next, other various means for detecting or estimating the angular positions of the rotor at the intervals of 30 degrees will be described:

(1) In a case where slits are provided in the rotor so as to interrupt light with regard to the polarities of the magnetic fields of the rotor, similar rotor angular-position signals are produced in such a way that transmission type photosensors are similarly arranged instead of the magnetic sensors.

(2) In a case where the rotor is painted in different colors so that the reflection factor thereof for light may change in correspondence with the polarities of the magnetic fields of the rotor, similar rotor angular-position signals are produced in such a way that reflection type photosensors are similarly arranged instead of the magnetic sensors.

(3) In a case where the outputs of the magnetic sensors are not binary but are sinusoidal continuous waveforms, the angular positions of the rotor can be detected similarly at intervals of 30 degrees in such a way that the angular positions of the rotor are more finely decomposed according to the values of the signals.

(4) Even in case of a motor for which, as in the prior-art driving system, only three rotor angular-position detector elements are comprised and the positions of the rotor can be detected only at the steps of 60 degrees, when a sensor (such as rotary encoder or frequency discrimination type A.C. tacho-generator) which generates pulses at a frequency proportional to r.p.m. is built in for the purpose of velocity detection or the like, the angular positions of the rotor can be known by utilizing the pulses. The number of the pulses from the sensor is proportional to the rotational angle of the rotor, and in general, the frequency thereof is much higher than the frequency of the pulses generated by the rotor angular-position detector elements, so that the angular positions of the rotor can be detected at a resolution finer than 60 degrees. Assuming, for example, that twenty pulses be generated during the rotation of the rotor over 60 degrees, the tenth pulse is shot when the rotor has rotated 30 degrees more due to the change of the signal from the rotor angular-position detector element. Therefore, the angular positions of the rotor can be detected at steps of 30 degrees.

(5) In a case where the change of the velocity of the motor is not very abrupt, the angular positions of the rotor at steps of 30 degrees can be estimated in time. That is, since the time intervals of the rotor angular-position signals at 60-degree intervals detected by three Hall elements for detecting the rotational angular positions do not change very abruptly, the points of time corresponding to the halves of the time intervals can be estimated to indicate the angular positions of the rotor at the intervals of 30 degrees.

The above description has concerned the case where the present invention is applied to the three-phase D.C. brushless motor whose stator windings are in the Y-connection. However, the present invention is not restricted thereto, but it is similarly applicable to a three-phase D.C. brushless motor having stator windings in a delta connection and it brings forth similar effects.

Since the present invention is constructed as thus far described, it produces special effects as listed below:

(1) As compared with those in the case of the prior-art driving method, a static torque fluctuation and a dynamic torque fluctuation can be sharply reduced without lowering the efficiency of a motor, and also noise developing during the rotation of the motor can be sharply mitigated.

(2) In addition, the arrangements of a voltage control circuit or a current control circuit and a group of electronic switches may be the same as in the prior-art system. Therefore, the torque fluctuations can be sharply reduced by the addition of comparatively simple and inexpensive functions, for example, the addition of means for detecting the angular positions of a rotor, means for changing-over instructive voltages for the current control circuit or the voltage control circuit, and a logic circuit.

(3) Further, in the driving system of the present invention, the prior-art method of suppressing the torque fluctuations can be jointly employed. In this case, a still flatter torque can be attained with the lowering of the efficiency restrained.

What is claimed is:

1. A method of directly driving a three-phase D.C. brushless motor having a rotor and only one set of three phase stator windings with first, second and third terminals by means of first, second and third bipolar driving circuits, said method comprising the steps of:

(A) detecting each time said rotor rotates an electrical rotational angle of 30 degrees; and (B) controlling said first, second and third bipolar driving circuits to successively and cyclically switch the polarities of electric potentials applied to said first, second and third terminals of said stator windings by said first, second and third bipolar driving circuits so that the following conditions occur in order, each time a rotation of said rotor by an electrical rotational angle of 30 degrees has been detected (a) said first terminal is subjected to a negative potential, said second terminal is subjected to a positive potential and said third terminal is subjected to a negative potential;

(b) said first terminal is subjected to a negative potential, said second terminal is subjected to a positive potential and said third terminal is open;

(c) said first terminal is subjected to a negative potential, said second terminal is subjected to a positive potential and said third terminal is subjected to a positive potential;

(d) said first terminal is subjected to a negative potential, said second terminal is open and said third terminal is subjected to a positive potential;

(e) said first terminal is subjected to a negative potential, said second terminal is subjected to a negative potential and said third terminal is subjected to a positive potential;

(f) said first terminal is open, said second terminal is subjected to a negative potential and said third terminal is subjected to a positive potential;

(g) said first terminal is subjected to a positive potential, said second terminal is subjected to a negative potential and said third terminal is subjected to a positive potential;

(h) said first terminal is subjected to a positive potential, said second terminal is subjected to a negative potential and said third terminal is open;

(i) said first terminal is subjected to a positive potential, said second terminal is subjected to a negative potential and said third terminal is subjected to a negative potential;

(j) said first terminal is subjected to a positive potential, said second terminal is open and said third terminal is subjected to a negative potential;

(k) said first terminal is subjected to a positive potential, said second terminal is subjected to a positive potential and said third terminal is subjected to a negative potential; and (l) said first terminal is open, said second terminal is subjected to a positive potential and said third terminal is subjected to a negative potential;

whereby a revolving magnetic field which rotates 30 degrees step by step is produced.

2. A system for directly driving a three-phase D.C. brushless motor having a rotor and only one set of three phase stator windings with first, second and third terminals by means of first, second, and third bipolar driving circuits, said system comprising:

means for detecting each time said rotor rotates an electrical rotational angle of 30 degrees to produce a detection signal; and means for controlling said first, second, and third bipolar driving circuits to successively and cyclically switch the polarities of electric potentials applied to said first, second and third terminals of said stator windings by said first, second and third bipolar driving circuits in response to said detection signal, so that the following conditions occur in order:

(a) said first terminal is subjected to a negative potential, said second terminal is subjected to a positive potential and said third terminal is subjected to a negative potential;

(b) said first terminal is subjected to a negative potential, said second terminal is subjected to a positive potential and said third terminal is open;

(c) said first terminal is subjected to a negative potential, said second terminal is subjected to a positive potential and said third terminal is subjected to a positive potential;

(d) said first terminal is subjected to a negative potential, said second terminal is open and said third terminal is subjected to a positive potential;

(e) said first terminal is subjected to a negative potential, said second terminal is subjected to a negative potential and said third terminal is subjected to a positive potential;

(f) said first terminal is open, said second terminal is subjected to a negative potential and said third terminal is subjected to a positive potential;

(g) said first terminal is subjected to a positive potential, said second terminal is subjected to a negative potential and said third terminal is subjected to a positive potential;

(h) said first terminal is subjected to a positive potential, said second terminal is subjected to a negative potential and said third terminal is open;

(i) said first terminal is subjected to a positive potential, said second terminal is subjected to a negative potential and said third terminal is subjected to a negative potential;

(j) said first terminal is subjected to a positive potential, said second terminal is open and said third terminal is subjected to a negative potential;

(k) said first terminal is subjected to a positive potential, said second terminal is subjected to a positive potential and said third terminal is subjected to a negative potential; and (l) said first terminal is open, said second terminal is subjected to a positive potential and said third terminal is subjected to a negative potential, whereby a revolving magnetic field which rotates 30 degrees step by step is produced.

3. A system as claimed in claim 2 wherein said controlling means includes a current control circuit for controlling values of the currents through the stator windings in response to said switching.

4. A system as claimed in claim 2 wherein said controlling means includes a voltage control circuit for controlling values of voltages applied across terminals of the stator windings in response to said switching.

5. A system as claimed in claim 2 wherein said controlling means includes a regulated voltage circuit which continually applies a constant voltage across terminals of the stator windings.

6. A three-phase D.C. brushless motor having a rotor and only one set of three phase stator windings with first, second and third bipolar driving circuits, said motor comprising:

means for detecting each time said rotor rotates an electrical rotational angle of 30 degrees to produce a detection signal; and means for controlling said first, second and third bipolar driving circuits to successively and cyclically switch the polarities of electric potentials applied to said first, second and third bipolar driving circuits in response to said detection signal, so that the following conditions occur in order:

(a) said first terminal is subjected to a negative potential, said second terminal is subjected to a positive potential and said third terminal is subjected to a negative potential;

(b) said first terminal is subjected to a negative potential, said second terminal is subjected to a positive potential and said third terminal is open;

(c) said first terminal is subjected to a negative potential, said second terminal is subjected to a positive potential and said third terminal is subjected to a positive potential;

(d) said first terminal is subjected to a negative potential, said second terminal is open and said third terminal is subjected to a positive potential;

(e) said first terminal is subjected to a negative potential, said second terminal is subjected to a negative potential and said third terminal is subjected to a positive potential;

(f) said first terminal is open, said second terminal is subjected to a negative potential and said third terminal is subjected to a positive potential;

(g) said first terminal is subjected to a positive potential, said second terminal is subjected to a negative potential and said third terminal is subjected to a positive potential;

(h) said first terminal is subjected to a positive potential, said second terminal is subjected to a negative potential and said third terminal is open;

(i) said first terminal is subjected to a positive potential, said second terminal is subjected to a negative potential and said third terminal is subjected to a negative potential;

(j) said first terminal is subjected to a positive potential, said second terminal is open and said third terminal is subjected to a negative potential;

(k) said first terminal is subjected to a positive potential, said second terminal is subjected to a positive potential and said third terminal is subjected to a negative potential; and (l) said first terminal is open, said second terminal is subjected to a positive potential and said third terminal is subjected to a negative potential, whereby a revolving magnetic field which rotates 30 degrees step by step is produced.

* * * * *